(12) United States Patent
Kurtz

(10) Patent No.: US 7,484,418 B1
(45) Date of Patent: Feb. 3, 2009

(54) ULTRA MINIATURE MULTI-HOLE PROBES HAVING HIGH FREQUENCY RESPONSE

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/983,009

(22) Filed: Nov. 6, 2007

(51) Int. Cl.
*G01L 9/00* (2006.01)
(52) U.S. Cl. .................................... 73/754
(58) Field of Classification Search ............... 73/754, 73/756, 862.68
See application file for complete search history.

(56) References Cited

U.S. PATENT DOCUMENTS

| | | | |
|---|---|---|---|
| 5,286,671 A | | 2/1994 | Kurtz et al. |
| 6,210,989 B1 * | | 4/2001 | Kurtz et al. ............. 438/51 |
| 6,272,929 B1 * | | 8/2001 | Kurtz et al. ............. 73/727 |
| 6,293,154 B1 * | | 9/2001 | Kurtz ..................... 73/727 |
| 6,327,911 B1 * | | 12/2001 | Kurtz et al. ............. 73/727 |
| 6,330,829 B1 * | | 12/2001 | Kurtz et al. ............. 73/717 |
| 6,424,017 B2 * | | 7/2002 | Kurtz et al. ............. 257/419 |
| 6,523,415 B2 * | | 2/2003 | Kurtz et al. ............. 73/727 |
| 6,861,276 B2 * | | 3/2005 | Kurtz ..................... 438/48 |

* cited by examiner

*Primary Examiner*—Andre J Allen
(74) *Attorney, Agent, or Firm*—The Plevy Law Firm

(57) ABSTRACT

A pressure probe includes a longitudinal tubular housing symmetrically disposed about a central axis and having an ultra miniature conical front end and an opened back end. A plurality of aperture ports having an opening are disposed about the front end. A plurality of ultra small leadless transducers has a central active deflecting area in a semiconductor substrate, and a layer of oxide on a bottom surface. At least one sensor network is disposed within the active area on the oxide layer. A glass contact wafer is bonded to the non-deflecting portion of sensing network and has a number of apertures surrounding the active area suitable for interconnection with header. A header encloses each transducer and is of a shape and size to be positioned in an associated aperture port of the probe housing. At least one lead is coupled to a header pin extending from bottom of the aperture and directed through the bottom opening into the hollow of the probe housing.

20 Claims, 6 Drawing Sheets

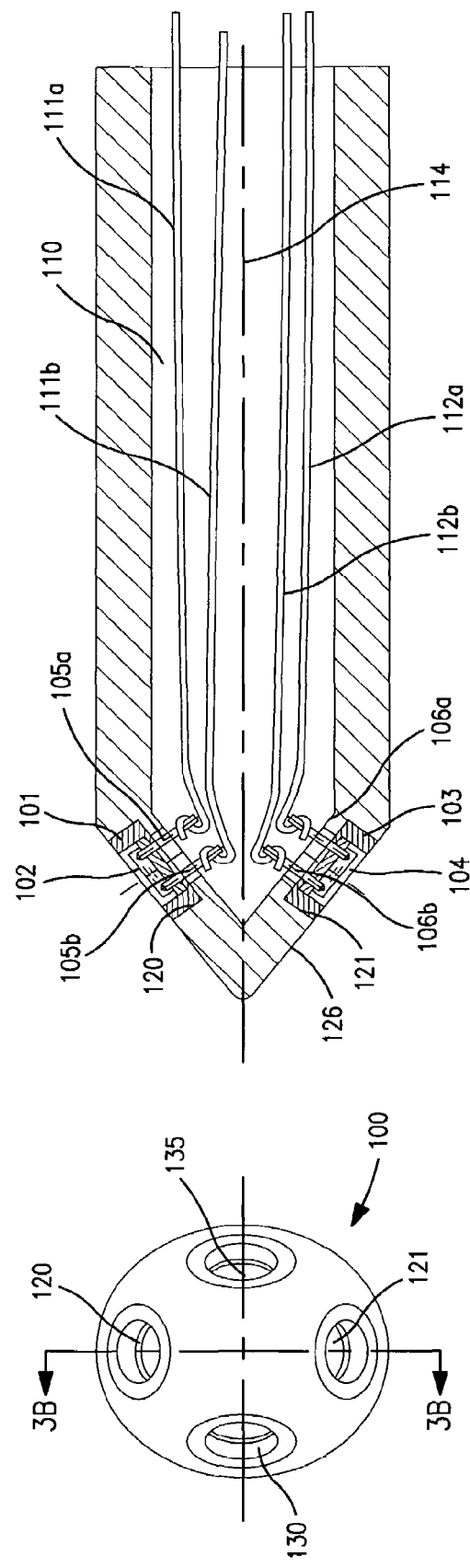

ULTRA MINIATURE MULTI-HOLE PROBES HAVING HIGH FREQUENCY RESPONSE

FIELD OF THE INVENTION

This invention relates to multi-hole pressure probes and more particularly to a multi-hole pressure probe containing piezoresistive sensors fabricated utilizing silicon-on-insulator (SOI) techniques.

BACKGROUND OF THE INVENTION

The so called multi-hole pressure probe has been a standard technique for measuring mean flow angles, stagnation and static pressures for over four decades. Generally, these probes make use of the known (through experiment or analysis) geometrical variation of all static pressure on fixed shapes (sphere, cylinder, wedge, etc.) which changes in a repeatable way as a function of that shape's orientation to the flow. Since the Mach number is a unique function of the ratio of stagnation to static pressure, it can also be derived from the pressures measured by such a probe. Up to two orthogonal flow angles as well as stagnation and static pressure can be deduced from pressures measured at four or five well chosen locations on the probe (using five rather than four measurement locations generally improves the accuracy but requires a larger probe). Fewer measurements yield fewer flow variables. For example, if the probe size is a concern, then two measurements can be used to find either one flow angle or stagnation and static pressures. The static pressure ports on these steady state probes are usually connected to remote pressure transducers via long lengths of small diameter tubing. This restricts their time response to several seconds or longer.

With the advent of miniature semiconductor pressure transducers in the late 1960's the pressure transducer could be moved much closer to the measurement location by mounting it in the probe body itself, thus enhancing the time response of the measurement. Such miniature semiconductor transducers were provided by Kulite Semiconductor Products, Inc., the assignee herein. Kulite Semiconductor Products, Inc. has many patents relating to miniature pressure transducers. The development of a miniature semiconductor pressure transducer led to the evolution of a class of so called high frequency response probes, with frequency responses in the kilohertz (Khz) range. Because of the relatively high drift rate of early semiconductor transducers, these probes were only used for unsteady measurements. Conventional remote transducers, fit through separate ports for use in high accuracy measurements of the steady state values. The new technology enabled the fabrication of probes that can survive harsh environmental characteristics as determined by the needs of industry and government, aero propulsion test facilities and the like.

High frequency response of these probes are set by three factors: (1) the frequency response of the transducer (generally much higher than other factors and so not limiting); (2) the resonant frequency of any cavity between the surface of the probe and a transducer diaphragm; and (3) the vortex shedding frequency of the probe body (which scales with the probe size and the fluid velocity). The latter two factors, 2 and 3 scale with the probe size so that smaller probes will yield higher usable frequency response.

Recent advances in semiconductor transducer technology have greatly improved the stability and accuracy, as well as increase the temperature range of the transducer. These advances combine to suggest that very small probes with wider dynamic range can measure the entire frequency range from steady state to over 10 Khz. Therefore, to improve the frequency response of such probes a smaller, flatter sensor with no cavities is required. In addition, the static responses of the transducers used in the probe are limited by the static properties of the sensors used in these probes. The sensing diaphragm made by solid state diffusion uses a P-N function to isolate the sensing network from the lower underlying bulk deflecting member. Since it is made using P-N junction isolation, of course static thermal properties are now limited in their upper temperature usefulness. Recent work has resulted in the manufacture of a new type of piezoresistive sensor using SOI techniques wherein the piezoresistive network is isolated from the deflecting material by an oxide layer, while being molecularly attached to it such is shown in FIG. 1 of U.S. Pat. No. 5,286,671 entitled, "Fusion Bonding Techniques for Use in Fabricating Semiconductor Devices", by Dr. A. D. Kurtz and assigned to Kulite Semiconductor Products, Inc., the assignee herein. The process for fabricating the composite dielectrically isolated structure requires the use of two separate wafers. The first "pattern" wafer is specifically selected to optimize the piezoresistive performance characteristics of the sensor chip, while the second "substrate wafer" is specifically selected for optimizing the micromachined capabilities of the sensing diaphragm. A layer of the higher quality thermally grown oxide is then grown on the surface of the substrate, while the piezoresistive patterns are introduced onto the pattern wafer. The piezoresistive patterns are diffused to the highest possible concentration level, equal to solid solubility, in order to achieve the most stable, long term electrical performance characteristics of the sensing network. Once the pattern and the substrate wafers are appropriately processed, the two wafers are fusion bonded together in accordance with the above-noted U.S. Pat. No. 5,286,671. The resulting molecular bond between the two wafers is as strong as the silicon itself, and since both the sensing elements and the diaphragm are made from the same material, there is no thermal mismatch between the two, thus resulting in a very stable and accurate performance characteristic with temperature. The presence of dielectric isolation enables the sensor to function at very high temperatures without any leakage effects associated with the P-N junction isolation type devices. Since the device is capable of operating at high temperatures, a high temperature metallization scheme is introduced to enable the device to interface with the header at these high temperatures.

The transducer formed by the techniques depicted in U.S. Pat. No. 5,286,671 as indicated above, enables the use of a probe which has an improved high frequency operation while being extremely small. The probe is basically a longitudinal tubular member having a front probe surface which contains holes or apertures. Each hole or aperture is associated with a separate transducer where each transducer contains a separate housing, which housing fits into the hole in the transducer probe. When mounting each transducer in its own miniature header, multiple transducers can be used simultaneously in a probe while further enabling the probe to be very small (less than 100 thousands of an inch (i.e. 100 mils) in diameter).

SUMMARY OF THE INVENTION

A miniature pressure probe, comprising: a longitudinal tubular body symmetrically disposed about a central axis and having a given diameter, the body having a front conical end and a back end, a plurality of transducer accommodating ports disposed about the front end, a plurality of leadless SOI transducers each having an active deflection area associated with a semiconductor substrate, each transducer having a header for supporting the same, with the transducer header having a thickness substantially less than the probe diameter, with each header and transducer positioned in an associated transducer port of the probe and operative to respond to flow pressure.

BRIEF DESCRIPTION OF THE FIGURES

FIG. 3 consists of FIG. 3A which is a front view of a probe while FIG. 3B is a cross-sectional view taken of the probe taken through line A-A of FIG. 3A.

DETAILED DESCRIPTION OF THE INVENTION

According to an embodiment of the invention, a multi-hole pressure probe has an internal hollow and has on the front end of the probe a plurality of apertures which communicate with the internal hollow. A pressure transducer has a first layer of semiconductor material bonded to a glass contact substrate, the semiconductor material having a central active area which deflects upon application of a force and a surface of the material is coated with an oxide layer. Positioned on the oxide layer are piezoresistive sensing elements. These sensing elements are positioned within a cavity on the glass substrate when the contact glass wafer is bonded to the semiconductor material. The glass substrate has apertures which are filled with a glass metal frit and contain header pins. The entire transducer is positioned within a separate header. A plurality of such transducers, are each positioned in its own header, and each is individually inserted into a respective aperture of the probe. This enables the measurement of flow angles, static pressures, within the structure. By mounting each sensor in its own miniature header, four or five such sensors can be used simultaneously in a probe while enabling the probe to be very small.

Figure 1:
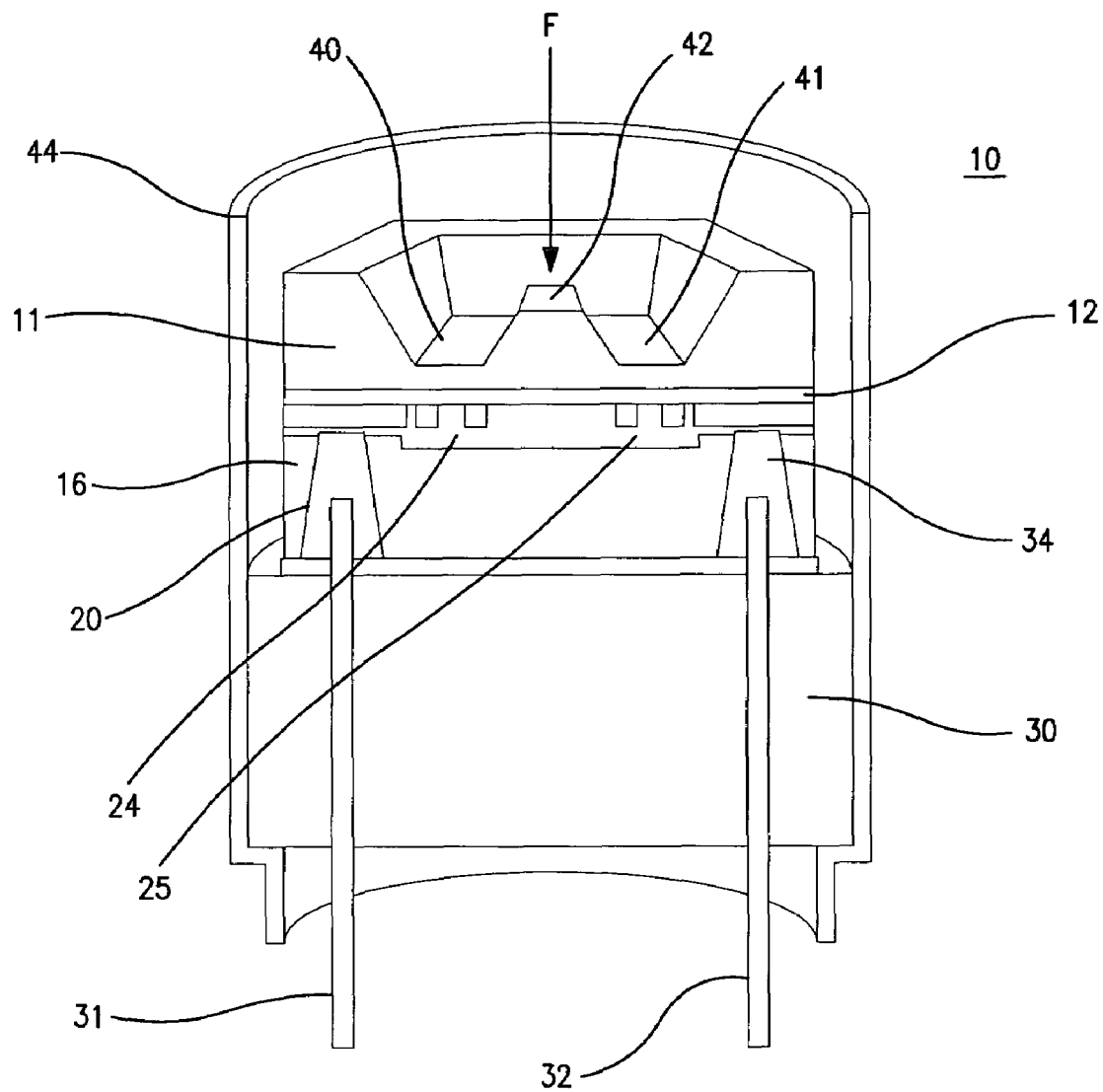
FIG. 1 is a cross-sectional view of a transducer and header arrangement fabricated by SOI technology.

Referring to FIG. 1 there is shown a transducer configuration using SOI techniques. In this technique, the piezoresistive network indicated by reference numerals 24 and 25 is configured in a Wheatstone bridge configuration and the piezoresistors as 24 and 25 which are four in number are isolated from the deflecting material by an oxide layer 12.

FIG. 1 also shows a surrounding header 44 which header houses and encloses the transducer apparatus. The process for fabricating the composite dielectrically isolated structure as shown in FIG. 1 requires the use of two separate wafers. The term substrate is used synonymously with the term wafer and is defined as being a small disc of material, either semiconductor or glass. The first pattern wafer is selected to optimize the piezoresistive performance characteristics of the sensor chip, while the second substrate wafer is specifically selected to optimize the micromachining capabilities of the sensing diaphragm. Once the wafers are bonded together, the non-doped side of the pattern wafer is selectively removed and the P+ network is left bonded to the oxide layer positioned on the substrate wafer. This forms a composite dielectrically isolated wafer. The deflection area is designated by reference numerals 40 and 41, with center boss designated as 42. Essentially, the regions, 40 and 41 are thin regions, also called active areas, and will deflect upon application of a force thereto. The piezoresistive sensors 24 and 25 are located within the active areas 40 and 41 and as indicated will vary their resistance upon application of a force thereto. The sensors 24 and 25 are also associated with contact areas which basically are metal and enable the device with the header to operate at desired temperatures. The metallization that is used for establishing high temperature contacts is PtSi/Ti/Pt. In this manner, the first layer of Pt silicide is used to create a high temperature ohmic contact to the device, the second (Ti) is used as both an adhesion layer and a barrier that prevents the top Pt layer from diffusing into the underlying PtSi ohmic contact layer at very high temperatures. Platinum (Pt) is used as a top layer because it is highly inert and is very suitable for high temperature operation.

Once the metallized contact barriers are defined, (using e.g. conventional photolithographic technology), the micromachining of the deflecting diaphragm takes place. The micromachining as for example, the machining of areas 40, 41 and 42 is performed using either a combination of different wet (isotropic and anisotropic) chemical processes or deep reactive ion etching (DRIE) can also be implemented. The shape and performance characteristics of the micromachined sensing or deflecting diaphragms are modeled using finite element analysis, and the SOI sensing chip is configured to be directly mounted into the probe body, thus eliminating redundancy and sensor packaging in probe installation which have historically increased the probe size. This also facilitates a better thermal match within the chip and its mount improving stability and accuracy. As indicated the piezoresistive patterns are isolated from the silicon substrate 11 by the silicon dioxide layer 12.

The layer of silicon dioxide is preferably a high quality grown oxide which is then grown on the surface of the substrate, while the piezoresistive patterns are introduced into the pattern wafer. The piezoresistive patterns are preferably diffused in highest possible concentration level equal to solid solubility, in order to achieve the most stable long term electrical performance characteristics of the sensing network. Once the pattern and the substrate wafers are appropriately processed, the two are fusion bonded together using the techniques described in the above noted U.S. Pat. No. 5,286,671 which is incorporated herein in its entirety. The resulting molecular bond between the two wafers is as strong as silicon itself and since both the sensing elements and the diaphragm are made from the same material, there is no thermal mismatch between the two, thus resulting in a very stable and accurate performance characteristic with temperature. The presence of dielectric isolation in the composite wafer 11 enables the sensor to function at very high temperatures without any leakage effects associated with the P-N junction isolation type devices.

As seen, bonded to the composite sensor 11 is a glass wafer contact wafer 16. The glass contact wafer 16 contains apertures 20. The apertures 20 eventually receive a glass metal frit to make contact to the contacts 34 associated with the piezoresistive sensors 24 and 25. The header contains a header glass layer 30 which layer is attached to the contact glass wafer by means of a glass frit bonding agent. As indicated the apertures 20 are filled with a glass metal frit and header pins 31 and 32 are inserted into each of the apertures before the glass metal frit hardens. When the glass metal frit hardens the header pins 31 and 32 are permanently retained within the glass metal frit filled apertures as 20.

Figure 2:
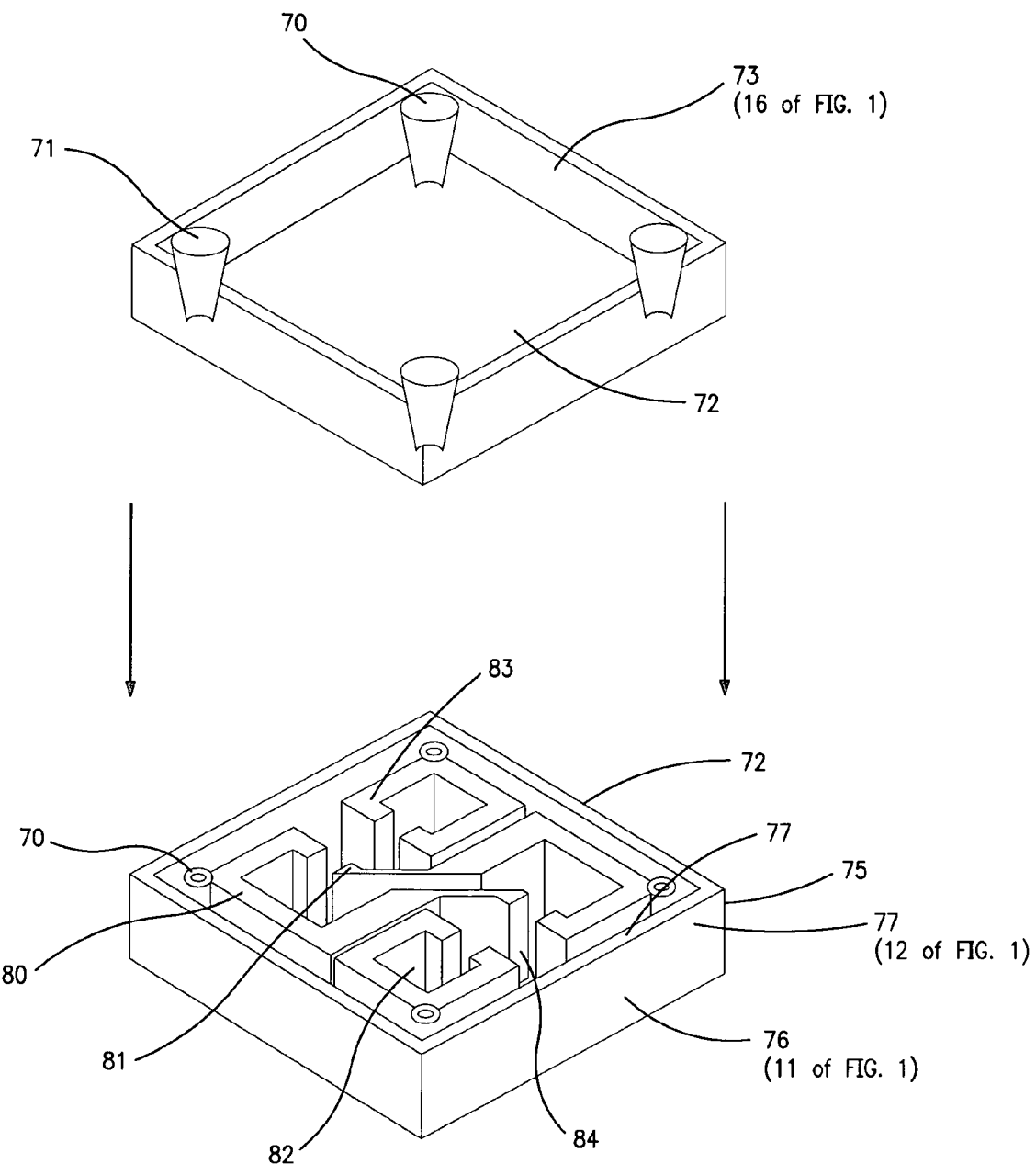
FIG. 2 is a perspective view of a transducer showing a glass contact wafer positioned above a silicon sensor wafer according to an embodiment of this invention.

Referring to FIG. 2 there is shown an exploded view of the semiconductor transducer depicted in FIG. 1. The transducer is shown without a header but basically shows the glass contact wafer 73 which is wafer 16 of FIG. 1 together with the contact through holes 70 and 71. Cavity 72 is formed in the contact glass wafer which cavity 72 enables diaphragm deflection. Bonded to the contact glass wafer 73 is a silicon composite sensor wafer 76 which is wafer 11 of FIG. 1. The wafer 76 has grown thereon a layer 77 of, for example, silicon dioxide 77. The layer 77 is configured as a peripheral rim which surrounds the active regions of the wafer 76. The wafer 76 contains piezoresistors as 81, 82, 83 and 84. These are analogous to piezoresistors 24 and 25 of FIG. 1. Thus as seen, there are four piezoresistors which are connected to form a Wheatstone bridge. The piezoresistors are P-type silicon piezoresistors protected by a silicon dioxide or other oxide coating.

Part of the connections, as indicated in FIG. 2 are made on the composite sensor wafer by means of connective land areas 80 which are connected at one end to a piezoresistor and at another end to another piezoresistor thus forming one arm of the bridge. The conductive land areas are each associated with a contact, such as contact 70 for land area 80. The configuration is well known and offers many advantages as indicated above. The leadless technology in accordance with U.S. Pat. No. 5,955,771, entitled "Sensor for Use in High Vibrational Applications and Methods for Fabricating the Same", to A. D. Kurtz, and A. Ned and assigned to the assignee herein and U.S. Pat. No. 5,973,590, entitled "Ultra-Thin Surface Mount Wafer Sensor Structures and Methods for Fabricating the Same" by A. D. Kurtz, A. Ned and S. Goodman, issued in 1999 to Kulite Semiconductor Products, Inc., show this technology (described above), thus achieving substantial sensor size reduction.

This technology as employed in FIGS. 1 and 2 is entirely capable of high frequency and high accuracy performance in high temperature, harsh environments. The leadless technology enables the mounting of the sensor chip "upside down" thus exposing only the backside of the sensor chip to the applied pressure. This is shown in FIG. 1 where the force (F) is applied to the top side of the silicon composite wafer. Meanwhile, the piezoresistors are isolated by the cavity 72 between semiconductor composite sensor wafer 11 and the glass contact wafer 16. The leadless technology also eliminates the use of gold wire bonds which can fail at high temperatures, under high vibration, or under dynamic pressure conditions. Thus, one uses a very high temperature glass/metal frit to connect between the leadless chip and a leadless header 44 on which the chip is mounted. The fabrication of the leadless chip requires processing of silicon on insulator (SOI) pattern wafer and the ceramic glass wafer.

The ceramic glass wafer which is designated as the contact glass wafer as 16 of FIGS. 1 and 73 of FIG. 2 is micromachined to be molecularly bonded to the pattern side of the SOI composite sensor wafer 76 of FIG. 2 or wafer 11 of FIG. 1 using the Anodic Bond method. The molecular bond takes place between the ceramic glass and the dielectrically isolated P+ Si layer. The bond takes place around the active area, the contact regions and also over the entire extending rim 85 of FIG. 2. Once the bond is made the sensing area is hermetically sealed from the surrounding environment, while the contacts are left accessible for interconnections only through adjacent openings in the contact glass. The contact areas are then filled with a thermally matched glass/metal frit and the chip is mounted onto a header using a high temperature non conductive glass. This glass is designed to fire at the same temperature as the glass/metal frit. Such glasses in combination with metals are well known and many examples exist in the prior art. The connections between the filled contacts and the header pins are made at the same time. Once the chip is mounted onto the header, only the backside of the sensor chip is exposed to the pressure medium as shown in FIG. 1. It is of course understood that the piezoresistors of 24 and 25 are hermetically protected and the overall thickness of the header-chip combination can be made as small as 10-20 mils (1 mil is equal to one-thousandth of an inch, i.e. 0.001 inch). The typical chip as shown in FIG. 1 and FIG. 2 will have an overall dimension on the order of 20 to 30 mils in diameter with a membrane thickness of 0.01 to 0.02 mils and having a high sensitivity and high accuracy. By designing the chip to have optimized sensing membranes by using Finite Element analysis software to model the chip's mechanical performance sensors having: 1) overall dimension on the order of 20 to 30 mils in diameter, 2) membrane thickness of 0.01 to 0.02 mils, 3) high sensitivity and 4) high accuracy are obtained. The probe design will take the full benefit of all the descried sensor features and will implement the custom designed leadless packaging methods. Such a structure, when used as the sensor in a multiple hole pressure probe gives rise to a number of advantages. By mounting each leadless sensor in its own miniature header four or five such sensors can be used simultaneously in a probe, while enabling the probe to be very small (less than 100 mils in diameter) as shown in FIG. 4. Since the leadless sensor is first affixed to its own header, the header sensor structure can have its leads attached before mounting in the probe as shown in FIG. 5. The small diameter and thickness of the mounted sensor/header combination makes it possible to pass the leads out of a central aperture in the probe body (shown in FIG. 6) and then affix the sensor header structure to a prepared position on the probe. The small overall thickness of the header-chip combination also insures that when mounted on the probe, it will not protrude past the surface and thus avoid distortion of the airflow. The design of the probe body can be customized for any application with the sensor/header selection kept separate. The probes utilizing this type of construction will be truly robust and capable of withstanding harsh environments, while exhibiting excellent performance characteristics. The probe design makes use of the full benefit of all the described sensor features and can be utilized to design specifically high frequency and reliable probes.

Referring to FIG. 3, which consists of FIGS. 3A and 3B, there is shown an angled probe according to this invention and employing the transducers as depicted FIG. 1 and FIG. 2. FIG. 3A shows a front view of the probe. As seen the probe 100 is circular in cross-section and has four probe holes or apertures namely 120, 130, 121 and 135. The probe 100 has a front conical surface as can be seen in FIG. 3B which shows a cross-sectional view taken through line 3B-3B of FIG. 3A. As seen, the probe 100 has an internal cavity 110 and is basically symmetrically disposed about the center line or axis 114. Each aperture contains a separate transducer, as 101 and 103 which transducer is associated with separate sensor structures as 102 and 104. The transducers 101 and 103 are the transducer structures shown in FIGS. 1 and 2. Thus the transducers have extending pins as pins 105a, 105b for transducer 101 and pins 106a, 106b for transducer 103. As seen, each transducer has its own housing which housing is accommodated by a probe aperture or port. The front of the probe, as indicated, is conical in shape. Each pin associated with the transducers is connected to its own wire as indicated by wires 111a, 111b for transducer 101 and 112a, 112b for transducer 102. Such a structure as shown in FIG. 3 when used as a sensor in a multiple hole pressure probe gives rise to a number of great advantages. By mounting each leadless sensor in its own miniature header four or five such sensors can be used simultaneously in a probe, while enabling the probe to be extremely small (less than 100 mils in diameter). Since the leadless sensor structure is first affixed to its own header, the header sensor structure can have its leads attached before mounting in the probe. This is clearly shown in FIG. 4.

Figure 4B:
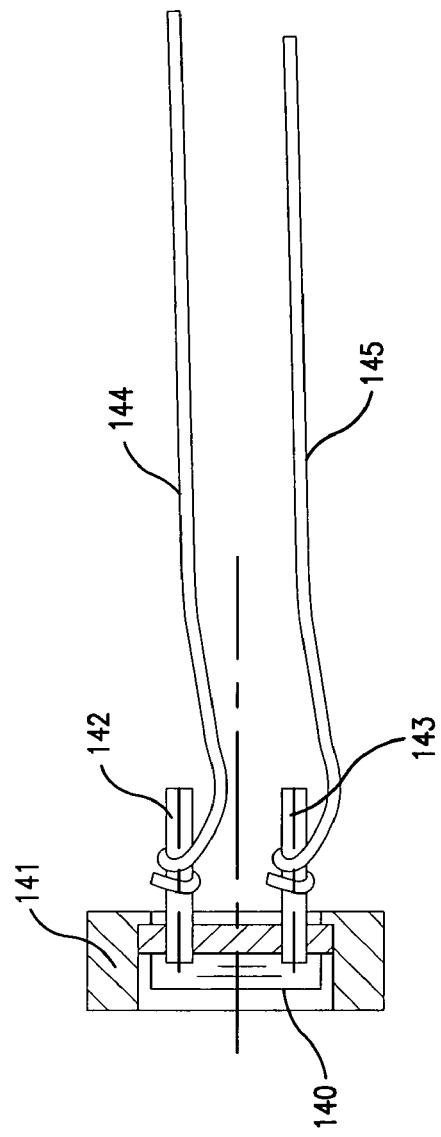
FIG. 4B is a cross-sectional view of the housing and sensor arrangement of FIG. 4A.
Figure 4A:
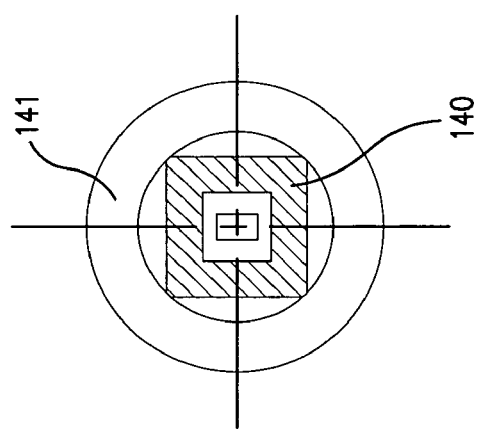
FIG. 4 consists of FIGS. 4A and 4B with FIG. 4A being a top view of a transducer having a housing according to this invention.

Thus, in FIG. 4, which consists of FIGS. 4A and 4B, there is shown a transducer header 141 which accommodates the sensor configuration 140 as that of FIGS. 1 and 2. The transducer housing 141 as indicated contains the sensor 140 and is associated with pins 142 and 143, where each pin has a wire such as 144 and 145 emanating there. These are analogous to pins 105a and 105b of FIG. 3.

Figure 5B:
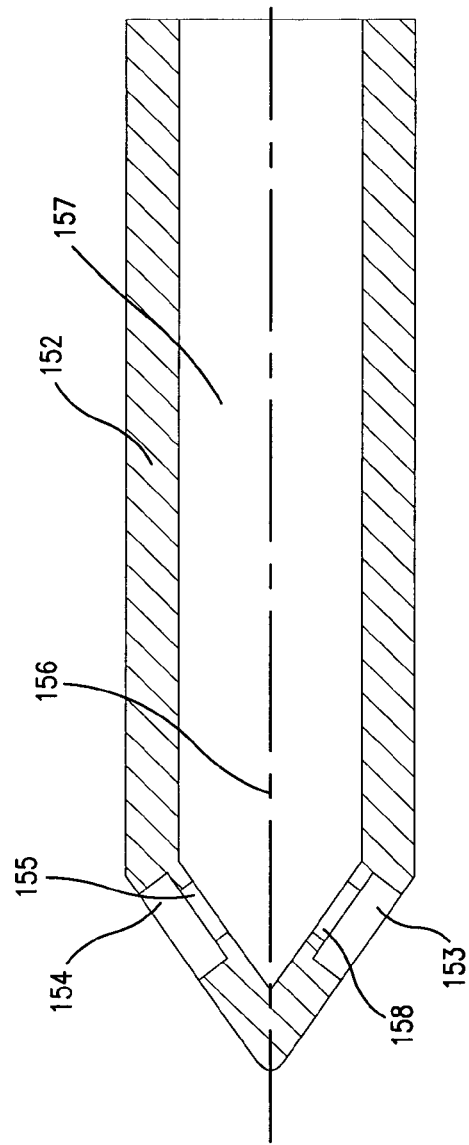
FIG. 5B shows a cross-sectional view of the sensor of FIG. 5A having an angled probe body.
Figure 5A:
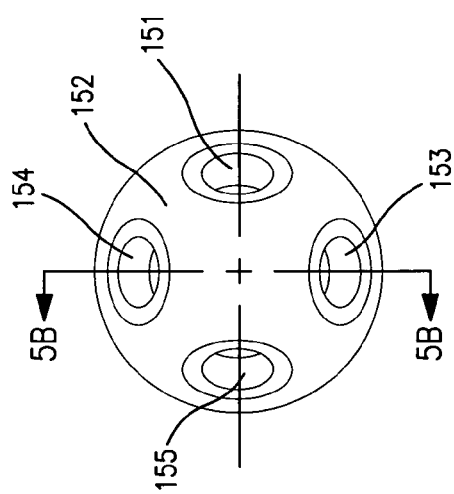
FIG. 5 consists of FIGS. 5A and 5B with FIG. 5A being a front view of a probe having a sensor assembly according to this invention.

FIG. 5A shows the front view of a probe 152. The probe has four apertures designated as 151, 153, 154 and 155. FIG. 5B shows a cross-sectional view. It is seen that the probe 152 is again symmetrically disposed about axis 156 and has the apertures 154, 153 adapted to accommodate an associated transducer as shown in FIG. 4. Thus, as seen the aperture 154 has a top portion which is of a size adapted to enclose and contain the transducer 141. The bottom portion of the aperture 154 has an opening 155 which communicates with the internal hollow 157 of the probe 152. Also aperture 153 has a top portion to accommodate the transducer and a smaller bottom portion 158 which also communicates with the hollow 157 of the probe. As one can see the configuration depicted in FIG. 4B together with wires 141 and 145 can be inserted into aperture 154 with the wires as 144 and 145 directed through the bottom portion or aperture 155 into the internal hollow 157 of the probe. In this manner, the entire structure is extremely compact and utilizes for example in particular in regard to FIG. 5 as well as FIG. 3, four separate transducers to measure four different flow values.

Figures 6A, 6B:
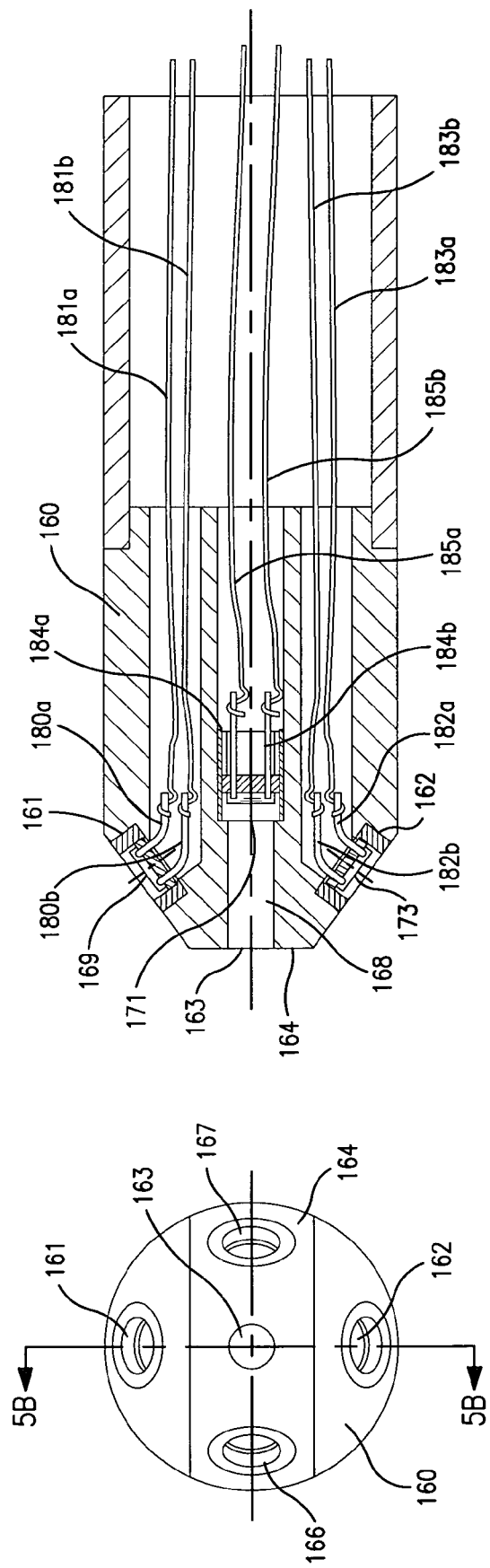
FIG. 6 consists of FIGS. 6A and 6B depicting an angle and static probe front view in FIG. 6A and depicting a cross-sectional view of the angle and static probe taken through line A-A of FIG. 6A.

Referring to FIG. 6, there is shown FIG. 6A which depicts a front view of an angle and static probe 160. FIG. 6B is a cross-sectional view taken through line 6B-6B of FIG. 6A. As seen, from FIG. 6A the probe 160 has a circular configuration and has port apertures 161, 162, 163, 166 and 167. Apertures 163, 166 and 167 are located on the flat front surface 164 of the probe with aperture 163 located at the center of the probe on the flat surface 164 while apertures 161 and 162 are positioned on the angled front portion of the probe as depicted in FIG. 6B.

As seen in FIG. 6B, each aperture, such as 161, 162, and 163 contains its own transducer structure. For example, transducer structure 169 is contained in aperture 161; transducer structure 173 is contained in aperture 162, and transducer structure 171 is contained in aperture 163. Aperture 163 communicates with an extended passage 168 where the end of passage 168 communicates with an aperture containing transducer structure 171. Each of the transducers is also associated with respective pins, as pins 180a, 180b associated with transducer 169; pins 182a, 182b associated with transducer 173; and pins 184a, 184b associated with transducer 171. The probe housing has openings surrounding each of the pins to enable the pins to be connected to wires such as 181a, 181b connected to pins 180a, 180b respectively, wires 185a, 185b connected to pins 184a, 184b respectively and wires 183a, 183b connected to pins 182a, 182b respectively. This enables connections to the piezoresistive sensor arrangements on each of the transducers. Thus, as one can ascertain, by mounting each leadless sensor in its own miniature header to provide probe design that enables a multiple number of transducers to be employed in a single probe. Since the leadless sensor is affixed to its own header the resultant transducer structure can have its leads attached before mounting in the probe as explained above. The small diameter and thickness of the mounted sensor/header combination makes it possible to pass the leads out of a central aperture in the probe body as shown for example in FIG. 6 and then affix the sensor header structure to a prepared position on the probe. The design of the probe body can be customized for any application where the sensor/header selection kept separate.

The probes utilized in this type of construction are truly robust and capable of withstanding harsh environments while exhibiting excellent performance characteristics. Additionally, the new leadless assembly/packaging of the probes enables one to implement an additional center transducer as shown in FIG. 6. This does not increase the size of the overall miniature probe. The central transducer is used for static measurements by placing it in the probe body itself and allowing a narrow tube to extend out to the front of the transducer to measure pressure applied to the front. This is a very useful configuration and is simply implemented with the transducers and headers depicted above.

It should be obvious to one skilled in the art that there are many additional configurations that can be employed and to fabricate probes of different sizes and construction. All of these alternate embodiments are deemed to be encompassed within the spirit and scope of the claims appended hereto.

What is claimed is:

1. A pressure probe, comprising:
a longitudinal tubular probe housing symmetrically disposed about a central axis and having an ultra miniature conical front end and an opened back end, a plurality of apertures disposed about said front end, each aperture having an opening communicating with the hollow of said housing;
a plurality of ultra small leadless transducers, each comprised of a leadless SOI sensor and a header enclosing each transducer, the leadless sensor, being extremely thin and small is affixed onto the header, to provide a header transducer combination, said header being of a shape and size to be positioned in an associated aperture of said probe housing; and at least one lead coupled to said header pin and directed through said aperture into said hollow of said probe housing, wherein the extremely small size of the leadless transducers enables the apertures in the probe to be extremely small, spaced closely together, and appropriately angled of the air flow.

2. The pressure probe according to claim 1, wherein said semiconductor sensing element has a semiconductor substrate, said substrate having an active deflecting area on a top surface of said substrate and having a layer of oxide on a bottom surface, at least on P* doped sensor network disposed on said oxide layer and positioned within said active area, said sensor network coupled to a metal contact, a glass contact wafer bonded and having an aperture surrounding said active area, said glass wafer having a contact aperture directed from the top to the bottom of said glass wafer, said aperture contacting to said metal contact, said aperture filled with a conductive material and having a header pin extending from the bottom of said aperture to make conductive contact with said metal contact.

3. The pressure probe according to claim 2, wherein the thickness of said header transducer combination is between 10-20 mils.

4. The pressure probe according to claim 2, wherein said semiconductor substrate is fabricated from silicon and said oxide layer is a silicon dioxide ($SiO_2$) layer.

5. The pressure probe according to claim 1, wherein said sensor is piezoresistive sensor.

6. The pressure probe according to claim 5, wherein said piezoresistive sensor is a P type silicon sensing network over silicon dioxide.

7. The pressure probe according to claim 6, wherein said glass wafer is bonded to said oxide layer by an anodic bond.

8. The pressure probe according to claim 2, wherein said conductive material is a glass metal frit.

9. The pressure probe according to claim 2, wherein said conductive material is a conductive epoxy.

10. The pressure probe according to claim 1, wherein the conical front end is truncated thereby defining a flat front surface, said flat front surface having an aperture communicating with an associated transducer.

11. The pressure probe according to claim 10, wherein said transducer measure static pressures communicating with said aperture.

12. The pressure probe according to claim 1, wherein said probe housing is cylindrical and further includes a conical front end, with said apertures are positioned on said conical front end.

13. The pressure probe according to claim 1, further including at least four transducers with each transducer having a sensor network disposed on said oxide layer and interconnected to form a Wheatstone bridge.

14. The pressure probe according to claim 1, having each transducer contain no exposed wires and have a smooth exposed surface.

15. The pressure probe according to claim 1, wherein said opening has a larger diameter top opening contiguous with a smaller diameter bottom opening, with said bottom opening communicating with the hollow of said housing and with the larger opening accommodating and enclosing said transducer header.

16. The pressure probe according to claim 14, operative to also measure stagnation pressure.

17. The pressure probe according to claim 1, wherein each transducer responds to a different flow angle pressure.

18. A miniature pressure probe, comprising:
   a longitudinal tubular body symmetrically disposed about a central axis and having a given diameter, said body having a front conical end and a back end,
   a plurality of transducer accommodating ports disposed about said front end,
   a plurality of leadless SOI transducers each having an active deflection area associated with a semiconductor substrate, each transducer having a header for supporting the same, with the transducer header having a thickness substantially less than said probe diameter, with each header and transducer positioned in an associated transducer port of said probe and operative to respond to flow pressure.

19. The probe according to claim 18, wherein said probe diameter is less than 100 mils where the thickness of said transducer header is between 10-20 mils.

20. The probe according to claim 18 further including a glass wafer bonded to said substrate and surrounding said active area to allow said area to deflect upon application of pressure thereto.

\* \* \* \* \*